United States Patent
Arons et al.

(10) Patent No.: US 9,696,724 B1
(45) Date of Patent: Jul. 4, 2017

(54) TAKEOFF AUTOMATING SYSTEM, DEVICE, AND METHOD

(71) Applicant: Rockwell Collins, Inc., Cedar Rapids, IA (US)

(72) Inventors: Norm W. Arons, Cedar Rapids, IA (US); Kirk A. Kolek, Marion, IA (US); Brannen M. Clark, Marion, IA (US); Mark Wayne Volner, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/135,798

(22) Filed: Apr. 22, 2016

(51) Int. Cl.
 *G05D 1/04* (2006.01)
 *B64D 31/06* (2006.01)
 *G05D 1/06* (2006.01)
 *G05D 1/02* (2006.01)

(52) U.S. Cl.
 CPC ............ *G05D 1/042* (2013.01); *B64D 31/06* (2013.01); *G05D 1/0202* (2013.01); *G05D 1/0661* (2013.01)

(58) Field of Classification Search
 CPC .... G05D 1/042; G05D 1/0808; G05D 1/0661; G05D 1/0202; B64D 31/06; B64C 13/18
 See application file for complete search history.

(56) References Cited

U.S. PATENT DOCUMENTS

| | | | | | |
|---|---|---|---|---|---|
| 5,299,765 | A * | 4/1994 | Blechen | ............... | G05D 1/0661 244/182 |
| 7,930,075 | B2 * | 4/2011 | Alcantara | ............ | G05D 1/0661 701/15 |
| 8,670,881 | B2 * | 3/2014 | DeJonge | ............. | G05D 1/0661 244/1 N |
| 2008/0114503 | A1 * | 5/2008 | Burnside | ............. | G05D 1/0661 701/3 |
| 2011/0295450 | A1 * | 12/2011 | Boorman | ............... | G01C 23/00 701/16 |
| 2013/0092791 | A1 * | 4/2013 | Bakker | .................. | G08G 5/006 244/1 N |
| 2015/0362920 | A1 * | 12/2015 | McGregor | ........... | G05D 1/0214 701/15 |

* cited by examiner

Primary Examiner — Michael J Zanelli
(74) Attorney, Agent, or Firm — Daniel M. Barbieri; Donna P. Suchy; Angel N. Gerdzhikov

(57) ABSTRACT

A system, device, and method for a takeoff (T/O) of an aircraft are disclosed. The T/O automating system may include an autothrottle system configured with a plurality of thrust modes, an autopilot system configured with a plurality of vertical guidance modes; and a flight management computer (FMC). The FMC may be configured to perform the method of receiving of input data representative of inputs of a T/O profile selection, a first profile altitude, a second profile altitude, and/or a third altitude; generating output data representative of outputs which includes a command engaging a thrust mode and a command engaging a vertical guidance mode to provide pitch attitude guidance commensurate to a speed and/or vertical speed; and providing the output data to the autothrottle system and the autopilot system. In some embodiments, the T/O profile could be a profile designed for one or more noise abatement departure profiles.

20 Claims, 5 Drawing Sheets

TAKEOFF AUTOMATING SYSTEM, DEVICE, AND METHOD

BACKGROUND

The United States Federal Aviation Administration (FAA) recognizes a takeoff (T/O) phase of flight as a criterial phase of flight. T/O is the phase of flight in which an aircraft goes through a transition from moving along the ground (taxiing) to flight. The speed required for T/O varies with aircraft performance factors including air density (affect by airport elevation and air temperature), aircraft weight, and aircraft configuration such as the position flaps and/or slats (high-lift devices). Other factors include the length and slope of the runway. In some aircraft, a flight management computer (FMC) may be programmed to determine T/O speeds.

Aircraft may employ "V-Speeds" which include V1, VR, VLOF, and V2. At speeds less than or equal to V1, the pilot may abort the T/O should a specific situation arise calling for the T/O to be aborted; above V1, the pilot may continue the T/O and return for landing. At VR, the pilot may begin "pull back on the stick"; in response, the aircraft begins to rotate about its lateral axis, and the nose wheel lifts off the ground while the main gear remains on the surface. At VLOF, the main gear leaves the surface as the aircraft lifts off and continues its acceleration. As V2 (i.e., a T/O safety speed) is reached, the aircraft may safely climb at a minimum climb gradient.

Under a typical or routine T/O phase of flight, the aircraft is placed into a T/O configuration which includes engine thrust being set at T/O power (or T/O thrust) and a deployment or an extension of flaps and/or slats. As the aircraft continues its T/O climb, the aircraft may be placed into a "clean" configuration with the retraction of flaps and/or slats; in addition, thrust may be set to a climb thrust setting as the aircraft transitions to the climb phase of flight.

If the aircraft is configured with an autothrottle (NT) system, it may be engaged during the T/O phase of flight. The A/T system may be armed after the pilot manually sets a throttle position for T/O thrust; alternatively, upon arming the NT system, mechanical actuators may drive the throttles to the T/O thrust position to align with the selection of T/O thrust mode. Thereafter, upon completion of the T/O phase, the thrust mode selection can be transitioned to climb thrust mode and A/T system may automatically drive the throttles to a climb thrust position. Because thrust may be controlled by the A/T system during the T/O phase, the pilot may place more of his or her focus on controlling the pitch attitude of the aircraft to maintain the desired T/O climb speed until the T/O phase is completed.

From time to time, a T/O phase of flight may not be typical or routine. One such time arises when a noise abatement procedure for a runway(s) is placed into effect near a noise sensitive area(s). In Advisory Circular (AC) 91-53A published by the FAA on Jul. 22, 1993 and entitled "Noise Abatement Departure Procedures" (NADP), the FAA discusses safe thrust reduction criteria for NADPs and provides two departure profiles that may provide environmental benefits to communities surrounding airports: a close-in community NADP and a distant community NADP.

SUMMARY

Embodiments of the inventive concepts disclosed herein are directed to a system, device, and method for automating a takeoff (T/O) of an aircraft. The inventive concepts disclosed herein may permit an application of pilot-designated altitudes to a pilot-selected NADP from which commands are determined and provided to an autothrottle system and an autopilot system.

In one aspect, embodiments of the inventive concepts disclosed herein are directed to a system for automating a T/O of an aircraft. The T/O automating system may include an autothrottle system, an autopilot system, and a flight management computer (FMC).

In a further aspect, embodiments of the inventive concepts disclosed herein are directed to a device for automating a T/O of an aircraft. The device may include the FMC that may be configured (or programmed) to perform a method of automating a takeoff (T/O) of an aircraft.

In a further aspect, embodiments of the inventive concepts disclosed herein are directed to a method for automating a T/O of an aircraft. When properly configured, the FMC may receive input data representative of inputs including a selection of a T/O profile, a first altitude for the profile, and a second altitude for the profile; generate output data representative of two outputs which includes a command engaging a thrust mode and a command engaging a vertical guidance mode to provide pitch attitude guidance commensurate to a speed; and provide the output data to the autothrottle system and the autopilot system. In some embodiments, the T/O profile could be a profile designed for one or more noise abatement departure profiles.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1A:
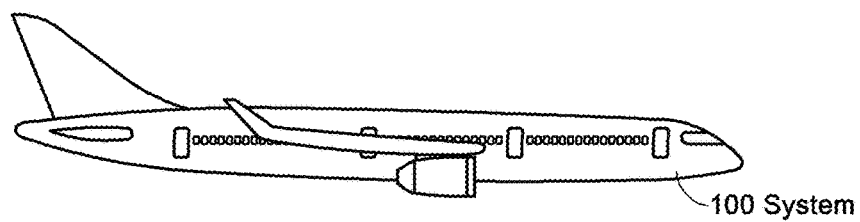
FIG. 1A depicts an exemplary illustration to an aircraft configured to employ a takeoff (T/O) automating system.
Figure 1B:
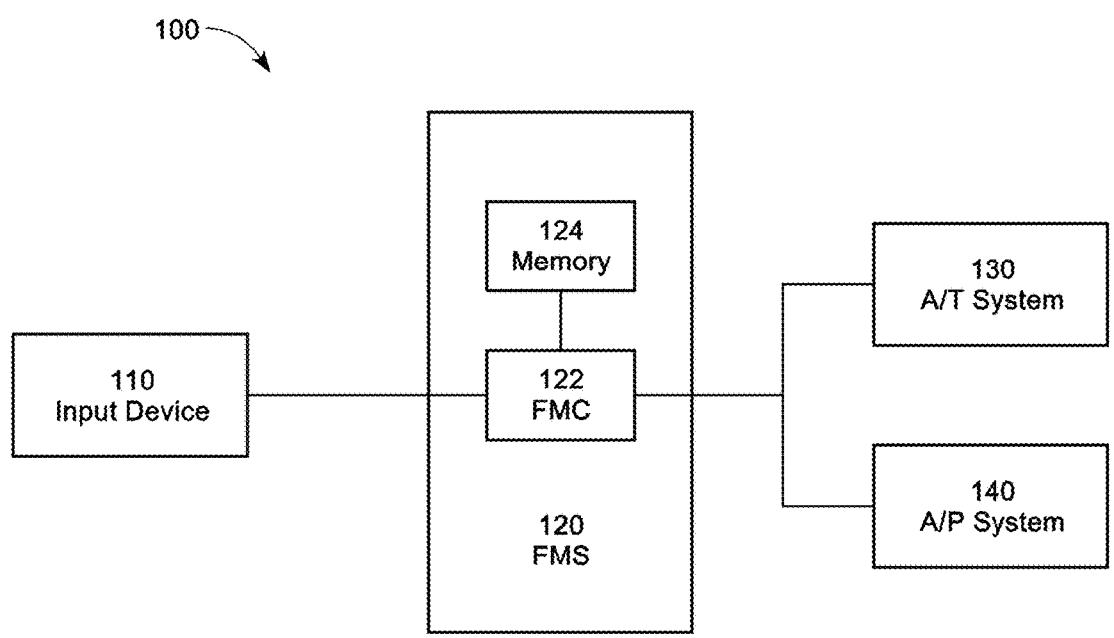
FIG. 1B depicts a block diagram of the T/O automating system.

Referring now to FIGS. 1A-1B an embodiment of a T/O automating system 100 suitable for implementation of the techniques described herein includes a input device 110, a flight management system (FMS) 120, an autothrottle (NT) system 130, an autopilot (NP) system 140.

The input device 110 could include any source for facilitating a pilot's entry of data. Such devices could include, but are not limited to, a tactile device configured with or without a gesture recognition system (e.g., keyboard, control display unit, cursor control device, stylus, electronic grease pen, handheld device, touch screen device, notebook, tablet, electronic flight bag, user-wearable device, etc. . . . ) and/or speech recognition systems. The input device 110 could be integrated with a display unit configured to receive pilot input (e.g., handheld device, touch screen device, notebook, tablet, etc. . . . ). In some embodiments, the input device 110 could include a flight control panel (FCP) such as one discussed by Barber in U.S. Pat. No. 8,965,601 entitled "System, Module, and Method for Presenting a Flight Director-Dependent HITS Pathway on an Aircraft Display Unit" (the Barber reference), which is hereby and herein incorporated by reference in its entirety.

The FMS 120 is known to those skilled in the art for performing a variety of functions designed to help a pilot with the management of the flight. The FMS 120 could include a flight management computer (FMC) 122 and a database 124, where the FMC 122 may perform the variety of functions.

The FMC 122 could include any electronic data processing unit which executes software or computer instruction code that could be stored, permanently or temporarily, in a digital memory storage device or a non-transitory computer-readable media (generally, memory 124) including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. The FMC 122 may be driven by the execution of software or computer instruction code containing algorithms developed for the specific functions embodied herein. FMC 122 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the FMC 122 could also include more than one electronic data processing unit. In some embodiments, the FMC 122 could be a processor(s) used by or in conjunction with any other system of the aircraft including, but not limited to, the input device 110, the NT system, and/or the A/P system 140.

In some embodiments, the terms "programmed" and "configured" are synonymous. In some embodiment, the term "data" could include any analog or digital signal, either discrete or continuous, which could contain information or be indicative of information. The FMC 122 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the FMC 122 via a physical or a virtual computer port. The FMC 122 may be programmed or configured to execute the method discussed in detail below. The FMC 122 may be programmed or configured to provide input and/or output data to various systems and/or units including, but not limited to, the input device 110, the NT system 130, and/or the A/P system 140.

The FMS 120 could include a database 124 configured to store data representative of, but not limited to, IAPs, ground-based navigational aids, waypoints, holding patterns, airways, airports, heliports, instrument departure procedures, precision approach aids, company routes, airport communications, localizer and airway markers, restricted airspace, and/or airport sector altitudes. The flight navigation database could be a database described in the following document published by Aeronautical Radio, Incorporated (ARINC): ARINC Specification 424 entitled "Navigations Systems Data Base" (ARINC 424), an aviation-industry publication that is hereby incorporated by reference in its entirety.

The functions performed by the FMC 122 could include receiving a flight plan and constructing a lateral and vertical flight plan from the flight plan. A pilot could create a flight plan from waypoints stored in a database or select a flight plan stored in a database of the FMS. Also, the flight plan may be modified at any time. In some embodiments, aircraft could mean any vehicle which is able to fly through the air or atmosphere including, but not limited to, lighter than air vehicles and heavier than air vehicles, wherein the latter may include fixed-wing, rotary-wing, and unmanned vehicles.

In a lateral flight plan, the FMC 122 could perform many functions including, but not limited to, navigational computations, radio navigation aids selections, and providing lateral flight information which could maintain the aircraft along the flight plan from takeoff (T/O) to landing. In a vertical flight plan, the FMC 122 could compute an optimum speed at each point, other characteristic speeds, and the aircraft weight and center of gravity. Then, it could compute time, fuel, and/or profile predictions along the flight plan based on these speeds and weight. It could also provide vertical flight information in reference to such predictions. Other miscellaneous performance computations are also made. Computations and underlying algorithms performed by the FMC 122 are known to those skilled in the art.

The pilot or flight crew may initialize the FMC 122 including, but not limited to, the selection of a flight plan, where such flight plan could provide the basis for all computations and displays. A flight plan may be composed of various lateral and vertical elements that may be defined during initialization, and may be defined from navigation data stored in an FMS database.

Lateral elements of a flight plan could include origin airport and runway; a departure procedure (DP) that may include, but is not limited to, a standard instrument departure (SID); an enroute transition; enroute airways and waypoints; an arrival procedure that may include, but is not limited to, an enroute transition, a standard terminal arrival route (STAR) procedure, a STAR-approach transition, an approach procedure, a missed approach procedure, and/or a holding procedure; and/or a flight plan to an alternate airport. Such procedures may be defined by various legs and waypoints between legs.

Vertical elements could include a T/O altitude which may include, but is not limited to, a thrust reduction altitude; an acceleration altitude; a T/O termination altitude and/or a T/O termination aircraft configuration using the inventive concepts described herein; altitude constraints at one or more waypoints located along the flight path; V/S and/or flight path angle constraints at one or more waypoints located along the flight plan; speed constraints at one or more waypoints along the flight plan; climb and descent speed limits; climb and descent step legs; and cruise flight levels. A vertical element could also include a cost index for the flight plan, a parameter that may determine flight time cost in units of fuel flow for providing information related to fuel cost versus time cost. The cost index could include a scale of optimization, where a low cost index may be associated with optimizing fuel consumption and a high cost index with optimizing time.

As noted above, a flight plan may be changed or revised at any time after initialization. For lateral elements, waypoints could be inserted or deleted; holding procedures could be inserted or modified; legs to fly directly to waypoints may be inserted; a DP or STAR procedure may be modified or introduced into the flight plan; the destination or alternate airport may be changed; and/or an offset path could be created to avoid hazardous meteorological conditions. For vertical elements, constraints associated with altitude, V/S, flight path angle, and speed between waypoints could be inserted, modified, or deleted; and/or climb and descent speeds could be inserted, modified, or deleted as well as climb and descent step legs. Cruise flight levels and a cost index could also be modified.

With respect to vertical elements, the FMC 122 may compute various speeds or mach numbers for the purpose of predicting time and fuel consumption. The predictions may be based on phase of flight profiles using assumptions based on pre-computed allowances and may take into account an actual flight profile established when an autopilot is engaged. The following brief discussion regarding the use of prediction profiles for the various phases of flight is provided for the purpose of illustration only and not of limitation.

A prediction profile of a T/O phase of flight may assume an aircraft is flown with maximum or reduced/de-rated T/O thrust at a specific speed until a thrust reduction altitude is reached. This could be followed with a prediction profile assuming the aircraft is flown with maximum or reduced/de-rated climb thrust at a specific setting until an acceleration altitude is reached. Then, a prediction profile of a climb phase may assume the aircraft is flown with maximum or reduced/de-rated climb thrust from the acceleration altitude until a climb speed selected by the pilot or aircrew is reached or the lower of an optimum speed, a climb speed limit, or a speed constraint is reached, thereby satisfying speed limits or constraints imposed upon the climb phase prediction profile; the pilot may select a speed using a device of the input device 110 including the FCP. In some embodiments, the FMC 122 could receive data input from other aircraft systems including, but not limited to, data representative of one or more flight modes and/or parameters from the input device 110. In addition, the FMC 122 could provide data representative of a flight plan to other aircraft systems including, but not limited to, the A/T system 130 and/or the A/P system 140 as well as a flight director system and/or the FCP disclosed in the Barber reference.

The A/T system 130 is known to those skilled in the art for helping the pilot manage thrust control during the to control the power setting by specifying a desired flight characteristic such as attaining and maintaining a speed or an assigned power for different phases of flight. The auto throttle could work with a flight director to fulfill the whole flight plan and greatly reduce the pilot's workload.

There may be two modes of the A/T system 130: a speed mode and a thrust mode. In a speed mode, the throttle is automatically positioned to attain a target speed. In a thrust mode, the engine could maintain a fixed power setting according to different phases of flight. In a T/O phase of flight, the A/T system 130 could maintain constant T/O thrust in a T/O phase of flight. In a climb phase of flight, the NT system 130 could be configured to maintain a constant climb setting during a climb phase of flight. If the mode is set to thrust mode, speed may be controlled by pitch attitude through an input made by the pilot; that is, pitch attitude may control the speed. In some embodiments, the NT system 130 may be employed by the pilot prior to the commencement of a T/O roll on the runway.

The A/P system 140 is known to those skilled in the art for reducing the pilot's workload of having to apply continuous manual input on a control, thereby helping to reduce pilot fatigue. In some embodiments, the A/P may generate control commands that could be provided to mechanical means which direct the movement of the control surfaces of an aircraft such as the elevator, aileron, and rudder. In some embodiments, the pilot may manually provide the A/P system 140 by selecting parameters corresponding to a vertical flight mode and a horizontal flight mode through the input device. A detailed discussion of a pilot's interaction with the FCP is found in the Barber reference.

Figure 2:
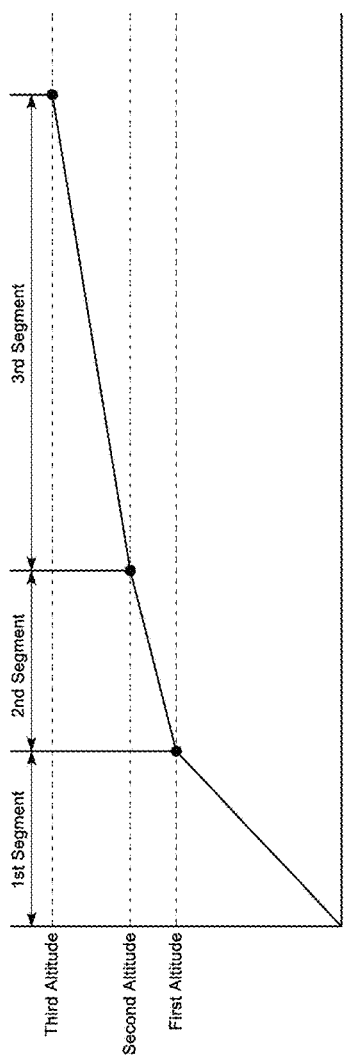
FIG. 2 depicts an exemplary illustration of a T/O path profile employable as a noise abatement departure procedure (NADP) is illustrated.
Figure 3:
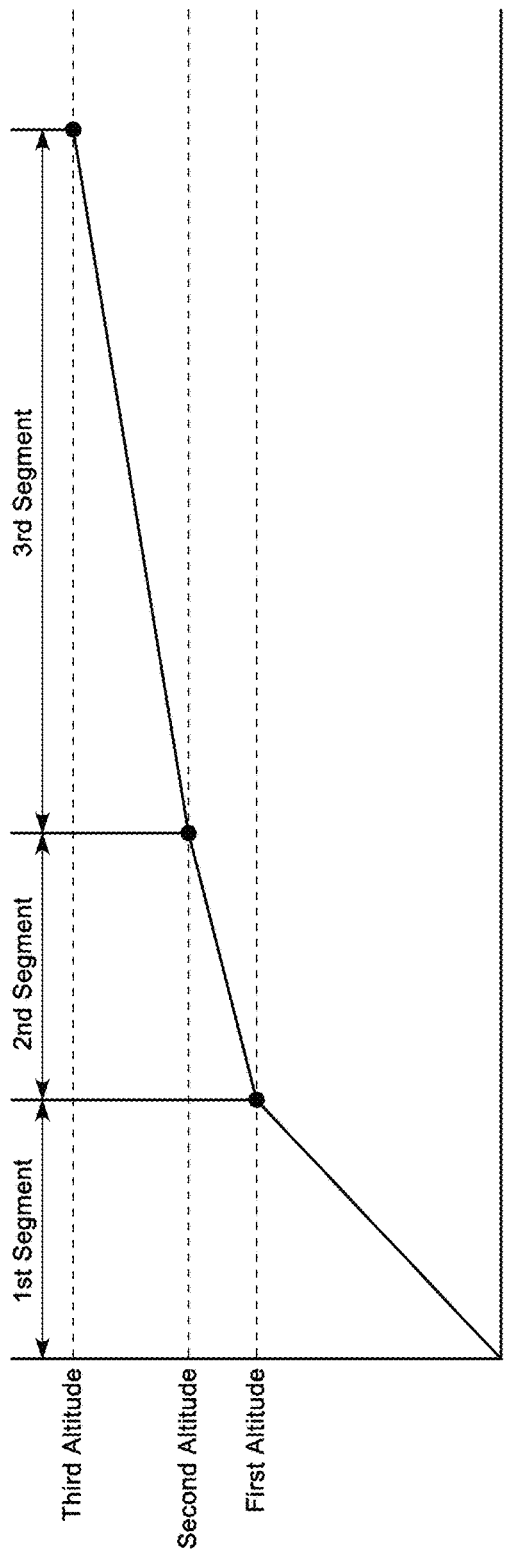
FIG. 3 depicts an exemplary illustration of a T/O path profile employable as a second NADP is illustrated.

Some advantages and benefits of the inventive concepts disclosed herein are shown in FIGS. 2 and 3, illustrating profiles of T/O paths that could be employed to automate T/O procedures. The illustrative profiles may be employed as departure procedures discussed in Advisory Circular (AC) 91-53A entitled "Noise Abatement Departure Procedures" (NADP) published the United States Federal Aviation Administration (FAA) and dated Jul. 22, 1993, which is hereby and herein incorporated by reference in its entirety. AC-91-53A discusses two departure profiles: a close-in community NADP and a distant community NADP.

Referring now to FIG. 2, an exemplary profile of a T/O path that could be employed as a close-in community NADP is illustrated. As shown, this profile may be defined by a plurality of climb segments, and each segment may be defined individually by a plurality of the following factors or parameters: thrust, speed, flaps, pitch, and vertical speed. The first segment may originate at a point where an initial climb speed is reached after lift-off. This segment could be defined by the following: a T/O thrust setting, a climb speed (here, assumed to be a single V2-based plus a configurable delta V), flaps extended to a T/O setting, and a pitch attitude and vertical speed commensurate to maintaining the V2-based climb speed at the T/O thrust setting and T/O flaps setting. In some embodiments, the V2-based speed may not be constant but could include a plurality of speeds. This segment may terminate at a first altitude defined or selected by the pilot prior to T/O.

The first altitude could be an altitude where thrust is reduced to a climb thrust setting while maintaining the other factors, which may necessarily include a lowering of pitch attitude so that claim speed(s) is maintained. This segment may terminate at a second altitude defined or selected by the pilot prior to T/O.

The second altitude could be an altitude where the aircraft begins an acceleration to a final T/O speed (VFTO) and a retraction of flaps to a cruise setting (e.g., fully retracted) pursuant to a flap retraction speed schedule while maintaining the other factors. In some embodiments, this segment may terminate at a third altitude selected by the pilot prior to T/O. In some embodiments, the third altitude could be an altitude specified in a DP or assigned by ATC.

Referring now to FIG. 3, an exemplary profile of a T/O path that could be employed as distance community NADP is illustrated. Similar to the profile shown in FIG. 2, this profile may be defined by a plurality of climb segments, where each segment may be defined individually by the same factors. The first segment may originate at a point where an initial climb speed is reached after lift-off and be defined by the following: a T/O thrust setting, a climb speed, flaps extended to a T/O setting, and a pitch attitude and vertical speed commensurate to maintaining the V2-based climb speed at the T/O thrust setting and T/O flaps setting. In some embodiments, the V2-based speed may not be constant but could include a plurality of speeds. This segment may terminate at a first altitude defined or selected by the pilot prior to T/O.

The first altitude could be an altitude where the aircraft begins an acceleration to VFTO and a retraction of flaps to a cruise setting pursuant to a flap retraction speed schedule while maintaining the other factors. This segment may terminate at a second altitude defined or selected by the pilot prior to T/O.

The second altitude could be an altitude where thrust is reduced to a climb thrust setting while maintaining the other factors, which may necessarily include a lowering of pitch attitude so that VFTO is maintained. In some embodiments, this segment may terminate at a third altitude selected by the pilot prior to T/O. In some embodiments, the third altitude could be an altitude specified in a DP or assigned by ATC.

Figure 4:
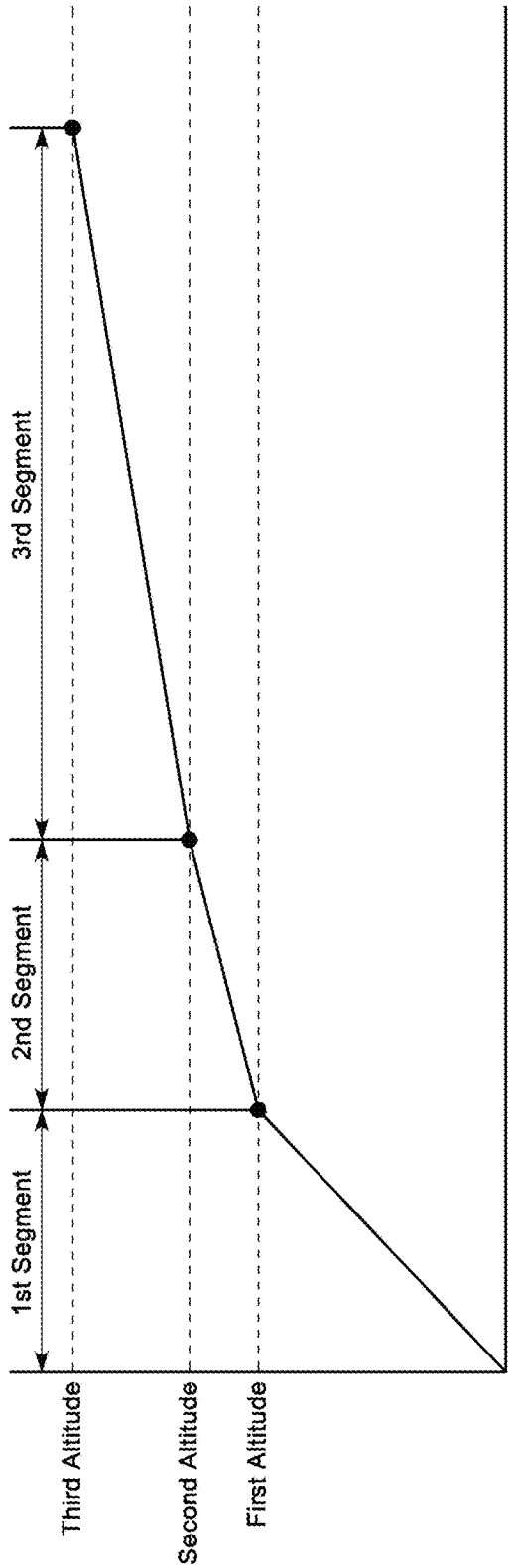
FIG. 4 illustrates a flowchart disclosing an embodiment of a method for automating a T/O of an aircraft.

Referring now to FIG. 4, an exemplary profile of a T/O path that could be employed as a close-in community NADP and/or distance community NADP is illustrated. Similar to the profiles shown in FIGS. 2 and 3, this profile may be defined by a plurality of climb segments. The first segment may originate at a point where an initial climb speed is reached after lift-off and be defined by the following: a T/O thrust setting, a climb speed, flaps extended to a T/O setting, and a pitch attitude and vertical speed commensurate to maintaining V2-based climb speed at the T/O flaps setting. In some embodiments, the V2-based speed may not be constant but could include a plurality of speeds. This segment may terminate at a first altitude defined or selected by the pilot prior to T/O.

The first altitude could be an altitude where the aircraft begins a climb gradient at a vertical speed defined or selected by the pilot prior to T/O while adjusting the thrust setting and pitch attitude commensurate to maintaining the V2-based climb speed(s) at the T/O thrust setting and T/O flaps setting. This segment may terminate at a second altitude defined or selected by the pilot prior to T/O.

The second altitude could be an altitude where the aircraft begins an acceleration to VFTO and a retraction of flaps to a cruise setting pursuant to a flap retraction speed schedule while maintaining the other factors. In some embodiments, this segment may terminate at a third altitude selected by the pilot prior to T/O. In some embodiments, the third altitude could be an altitude specified in a DP or assigned by ATC.

Figure 5:
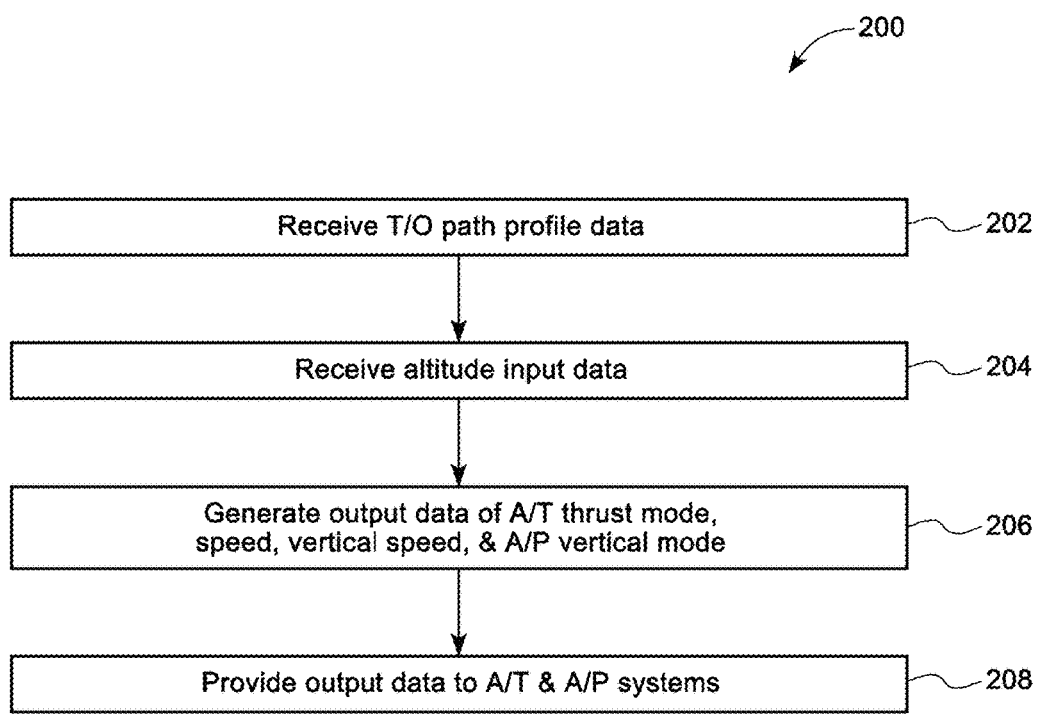
FIG. 5 depicts an exemplary embodiment of a flowchart disclosing a method for automating a T/O according to the inventive concepts disclosed herein.

FIG. 5 depicts flowchart 200 providing an example for automating a T/O of an aircraft, where the FMC 122 may be programmed or configured with instructions corresponding to the following modules that that are continuously executed throughout the aircraft operation. The FMC 122 may be a processing unit(s) of a module such as, but not limited to, a printed circuit card assembly having one or more input interfaces (e.g., virtual or physical computer ports) to facilitate data communications with the FMC 122, i.e., the receiving and providing of data (e.g., one or more electrical or optical signals including data and/or being indicative of data). For the accomplishment of the following modules embodied in FIG. 4, the acquiring of data is synonymous and/or interchangeable with reading, receiving, and/or the retrieval of data.

The method of flowchart 200 begins with module 202 with FMC 122 receiving profile input data representative of selection of an predefined T/O profile of a plurality of predefined T/O profiles that will actually be performed, where each predefined T/O profile could be retrieved from a database configured to store aircraft performance values, that may be used to determine an aircraft's performance during a T/O phase. In some embodiments, one predefined T/O profile may be designed to meet close-in community NADP criteria. In some embodiments, one predefined T/O profile may be designed to meet distant community NADP criteria. In some embodiments, the selection could be made by the pilot of the aircraft. In some embodiments, the selection could be made external to the aircraft and received via a datalink from, for example, a dispatch center or a provider of air navigation services.

The method of flowchart 200 continues with module 204 with the FMC 122 receiving altitude input data representative of selections of the plurality of altitudes for the T/O profile that will actually be performed. In some embodiments, a first altitude could be a thrust reduction altitude, a second altitude could be an acceleration altitude, and a third altitude could be a profile completion altitude. In some embodiments, a first altitude could be an acceleration altitude, a second altitude could be a thrust reduction altitude, and a third altitude could be a profile completion altitude. In some embodiments, a first altitude could be a climb gradient altitude; a second altitude at which thrust, speed, and flaps settings are adjusted in preparation for the next profile; and a third altitude could be a profile completion altitude.

In some embodiments, the selections could be made by the pilot of the aircraft. In some embodiments, the selections could be made prior to a flight and received from the database 124 configured to store a plurality of first altitudes, a plurality of second altitudes, and/or a plurality of third altitudes, where one of each of these altitudes may be specifically designated for one runway. In some embodiments, the selections could be made external to the aircraft and received via a datalink from, for example, a dispatch center or a provider of air navigation services.

The method of flowchart 200 continues with module 206 with the FMC 122 generating commands of thrust mode, speed(s), vertical speed, and autopilot vertical mode as a function of the profile input data and the altitude input data. With the selections of the predefined T/O profile and plurality of altitudes, commands may be generated for each segment of the predefined T/O profile.

In some embodiments, the commands may correspond to those shown in FIG. 2. For the first segment, the output data could include data representative of a T/O thrust command commensurate to a V-based speed that is provided to the NT system 130, and pitch and vertical speed commands commensurate to maintaining the speed that are provided to the A/P system 140. For the second segment, the output data could include data representative of a climb thrust command commensurate to the same speed that is provided to the NT system 130, and pitch and vertical speed commands commensurate to maintaining the speed that are provided to the A/P system 140. For the third segment, the output data could include data representative of the climb thrust command commensurate to VFTO that is provided to the A/T system 130, and pitch and vertical speed commands commensurate to maintaining VFTO that are provided to the A/P system 140. During these three segment, the FMC 122 could monitor the flaps setting and alert the pilot if the setting does not correspond to the segment.

In some embodiments, the commands may correspond to those shown in FIG. 3. For the first segment, the output data could include data representative of a T/O thrust command commensurate to a V-based speed that is provided to the NT system 130, and pitch and vertical speed commands commensurate to maintaining the speed that are provided to the A/P system 140. For the second segment, the output data could include data representative of a T/O thrust command, and pitch and vertical speed commands commensurate to VFTO that are provided to the A/P system 140. For the third segment, the output data could include data representative of the climb thrust command commensurate to a VFTO speed that is provided to the A/T system 130, and pitch and vertical speed commands commensurate to maintaining the VFTO speed that are provided to the A/P system 140. During these three segment, the FMC 122 could monitor the flaps setting and alert the pilot is the setting does not correspond to the segment.

In some embodiments, the commands may correspond to those shown in FIG. 4. For the first segment, the output data could include data representative of a T/O thrust command commensurate to a V-based speed that is provided to the NT system 130, and pitch and vertical speed commands commensurate to maintaining the speed that are provided to the A/P system 140. For the second segment, the output data could include data representative of a command commensurate a pilot-selected climb gradient and the V-based speed, and pitch and vertical speed commands commensurate to pilot-selected climb gradient that are provided to the A/P system 140. For the third segment, the output data could include data representative of the climb thrust command commensurate to a VFTO speed that is provided to the A/T system 130, and pitch and vertical speed commands commensurate to maintaining the VFTO speed that are provided to the A/P system 140. During these three segment, the FMC 122 could monitor the flaps setting and alert the pilot is the setting does not correspond to the segment.

The method of flowchart 200 continues with module 208 with the FMC 122 providing the output command data representative of the speed(s) and a thrust command to the A/T system 130, and output data representative of the speed(s) and a command to engage pitch guidance to the A/P system 140. Then, the method of flowchart 200 ends.

It should be noted that the method steps described above may be embodied in computer-readable media stored in a non-transitory computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for automating a takeoff (T/O) of an aircraft, comprising:
an autothrottle system configured with a plurality of thrust modes;
an autopilot system configured with a plurality of vertical guidance modes; and
a flight management computer including at least one processor coupled to a non-transitory processor-readable medium storing processor-executable code and configured to:
receive first input data representative of a selection of one T/O profile of a plurality of T/O profiles, where each one of the T/O profiles is comprised of a plurality of segments and a plurality of altitudes, where
each one of the plurality of segments is defined by one thrust mode of the autothrottle system, at least one vertical guidance mode of the autopilot system, and at least one speed;
receive second input data representative of an input of a first altitude of the selected T/O profile;
receive third input data representative of an input of a second altitude of the selected T/O profile;
generate first output data and second output data as a function of the first input data, the second input data, and third input data during a performance of the selected T/O profile, where
the first output data is representative of the at least one speed and a command engaging one thrust mode of the plurality of thrust modes commensurate to the at least one speed for each one of the plurality of segments of the selected T/O profile, and
the second output data is representative of the at least one speed and a command engaging at least one vertical guidance mode to provide pitch attitude guidance commensurate to the at least one speed for each one of the plurality of segments of the selected T/O profile; and
provide the first output data and second output data to the autothrottle system and the autopilot system, respectively, whereby
the autothrottle system and the autopilot system are responsive to a receiving of the first output data and the second output data, respectively.

2. The system of claim 1, wherein the second input data and third input data are received through a pilot input device.

3. The system of claim 1, further comprising:
a database configured to store a first altitude and a second altitude for each one of the plurality of T/O profiles, such that
each one of the plurality of T/O profiles are specifically designated for one runway, and
the second input data and third input data are received from the database.

4. The system of claim 1, wherein one T/O profile of a plurality of T/O profiles is a noise abatement departure profile.

5. The system of claim 4, wherein the noise abatement departure profile is a close-in community departure profile or a distant community departure profile.

6. The system of claim 1, wherein each one of the plurality of segments is further defined by one vertical speed, where
the second output data is further representative of the vertical speed.

7. The system of claim 1, wherein
the flight management computer is further configured to:
receive fourth input data representative of an input of a third altitude of the selected T/O profile, such that
the function for generating the first output data and the second output data includes the fourth input data.

8. A device for automating a takeoff (T/O) of an aircraft, comprising:
a flight management computer including at least one processor coupled to a non-transitory processor-readable medium storing processor-executable code and configured to:
receive first input data representative of a selection of one T/O profile of a plurality of T/O profiles, where each one of the T/O profiles is comprised of a plurality of segments and a plurality of altitudes, where
each one of the plurality of segments is defined by one thrust mode of an autothrottle system, at least one vertical guidance mode of an autopilot system, and at least one speed;
receive second input data representative of an input of a first altitude of the selected T/O profile;
receive third input data representative of an input of a second altitude of the selected T/O profile;
generate first output data and second output data as a function of the first input data, the second input data, and third input data during a performance of the selected T/O profile, where
the first output data is representative of the at least one speed and a command engaging one thrust mode of the plurality of thrust modes commensurate to the at least one speed for each one of the plurality of segments of the selected T/O profile, and
the second output data is representative of the at least one speed and a command engaging at least one vertical guidance mode to provide pitch attitude guidance commensurate to the at least one speed for each one of the plurality of segments of the selected T/O profile; and
provide the first output data and second output data to the autothrottle system and the autopilot system, respectively, whereby
the autothrottle system and the autopilot system are responsive to a receiving of the first output data and the second output data, respectively.

9. The device of claim 8, wherein the second input data and third input data are received through a pilot input device.

10. The device of claim 8, wherein the second input data and third input data are received from a database configured to store a first altitude and a second altitude for each one of the plurality of T/O profiles specifically designated for one runway.

11. The device of claim 8, wherein one T/O profile of a plurality of T/O profiles is a noise abatement departure profile.

12. The device of claim 11, wherein the noise abatement departure profile is a close-in community departure profile or a distant community departure profile.

13. The device of claim 8, wherein each one of the plurality of segments is further defined by one vertical speed, where
the second output data is further representative of the vertical speed.

14. The device of claim 8, wherein
the flight management computer is further configured to:
receive fourth input data representative of an input of a third altitude of the selected T/O profile, such that the function for generating the first output data and the second output data includes the fourth input data.

15. A method for automating a takeoff (T/O) of an aircraft, comprising:
receiving, by a flight management computer configured with at least one processor coupled to a non-transitory processor-readable medium storing processor-executable code, first input data representative of a selection of one T/O profile of a plurality of T/O profiles, where each one of the T/O profiles is comprised of a plurality of segments and a plurality of altitudes, where
each one of the plurality of segments is defined by one thrust mode of an autothrottle system, at least one vertical guidance mode of an autopilot system, and at least one speed;
receiving second input data representative of an input of a first altitude of the selected T/O profile;
receiving third input data representative of an input of a second altitude of the selected T/O profile;
generating first output data and second output data as a function of the first input data, the second input data, and third input data during a performance of the selected T/O profile, where
the first output data is representative of the at least one speed and a command engaging one thrust mode of the plurality of thrust modes commensurate to the at least one speed for each one of the plurality of segments of the selected T/O profile, and
the second output data is representative of the at least one speed and a command engaging at least one vertical guidance mode to provide pitch attitude guidance commensurate to the at least one speed for each one of the plurality of segments of the selected T/O profile; and
providing the first output data and second output data to the autothrottle system and the autopilot system, respectively, whereby
the autothrottle system and the autopilot system are responsive to a receiving of the first output data and the second output data, respectively.

16. The method of claim 15, wherein the second input data and third input data are received through a pilot input device.

17. The method of claim 15, wherein the second input data and third input data are received from a database configured to store a first altitude and a second altitude for each one of the plurality of T/O profiles specifically designated for one runway.

18. The method of claim 15, wherein one T/O profile of a plurality of T/O profiles is a noise abatement departure profile.

19. The method of claim 15, wherein each one of the plurality of segments is further defined by one vertical speed, where
the second output data is further representative of the vertical speed.

20. The method of claim 15, further comprising:
receiving fourth input data representative of an input of a third altitude of the selected T/O profile, such that the function for generating the first output data and the second output data includes the fourth input data.

* * * * *